US010864496B2

(12) United States Patent
Fraser et al.

(10) Patent No.: US 10,864,496 B2
(45) Date of Patent: *Dec. 15, 2020

(54) SYSTEM AND APPARATUS FOR PROCESSING MATERIAL TO GENERATE SYNGAS WITH A MULTI-PHASE POWER SOURCE

(71) Applicant: RESPONSIBLE ENERGY INC., Brockville (CA)

(72) Inventors: Gordon Gerald Donald Fraser, Elizabethtown (CA); Graham Campbell Houze, Elizabethtown (CA); Robert Christian Jensen

(73) Assignee: RESPONSIBLE ENERGY INC., Brockville (CA)

( * ) Notice: Subject to any disclaimer, the term of this patent is extended or adjusted under 35 U.S.C. 154(b) by 70 days.

This patent is subject to a terminal disclaimer.

(21) Appl. No.: 15/970,671

(22) Filed: May 3, 2018

(65) Prior Publication Data
US 2018/0250650 A1    Sep. 6, 2018

Related U.S. Application Data

(63) Continuation of application No. PCT/CA2015/000564, filed on Nov. 3, 2015.

(51) Int. Cl.
*B01J 19/08* (2006.01)
*C10J 3/72* (2006.01)
*B01J 8/00* (2006.01)

(52) U.S. Cl.
CPC .......... *B01J 19/088* (2013.01); *B01J 8/0015* (2013.01); *C10J 3/721* (2013.01); *C10J 3/723* (2013.01);

(Continued)

(58) Field of Classification Search
CPC combination set(s) only.
See application file for complete search history.

(56) References Cited

U.S. PATENT DOCUMENTS 5,028,248 A * 7/1991 Williams ............... C03B 5/025
373/20
5,847,353 A * 12/1998 Titus ...................... A62D 3/19
219/121.36

(Continued)

FOREIGN PATENT DOCUMENTS

WO    WO2009082123    *  7/2009    ............. C21B 13/00

*Primary Examiner* — Kaity V Chandler
(74) *Attorney, Agent, or Firm* — Sean Murray; Murray IP Consulting Inc

(57) ABSTRACT

System for processing material to generate syngas in a modular architecture may include a plurality of primary reactor chambers and a shared secondary reactor chamber. Each primary reactor chamber includes electrodes protruding into the chamber, the electrodes operable to generate an arc capable to generate first-stage gas from breakdown of the material when electricity is applied to the electrodes. The secondary reactor chamber is operable to receive the first-stage gas generated by the plurality of primary reactor chambers and to receive water vapour. The gas generated within the plurality of primary reactor chambers combine and interact with the water vapour to form second-stage gas. Turbulence can be generated within the secondary reactor chamber to improve mixing of the first-stage gas with the water vapour. Powering of each of the primary reactor chambers can be done with a different phase of power from a multi-phase input to ensure balanced power utilization.

17 Claims, 14 Drawing Sheets

(52) U.S. Cl.
CPC .... *B01J 2219/083* (2013.01); *B01J 2219/089* (2013.01); *B01J 2219/0813* (2013.01); *C01B 2203/0475* (2013.01)

(56) References Cited

U.S. PATENT DOCUMENTS

| | | | | |
|---|---|---|---|---|
| 6,269,112 | B1* | 7/2001 | Poloni | C21C 5/527 |
| | | | | 266/45 |
| 2002/0048545 | A1* | 4/2002 | Lewis | C10J 1/207 |
| | | | | 423/418.2 |
| 2009/0056604 | A1* | 3/2009 | Hartvigsen | F23G 5/02 |
| | | | | 110/250 |
| 2016/0045841 | A1* | 2/2016 | Kaplan | B03C 1/00 |
| | | | | 429/49 |
| 2016/0145520 | A1* | 5/2016 | Koulik | C10L 5/442 |
| | | | | 44/606 |
| 2016/0207113 | A1* | 7/2016 | Nagai | C04B 35/573 |
| 2017/0274344 | A1* | 9/2017 | Koiwasaki | H01J 37/32055 |
| 2018/0290208 | A1* | 10/2018 | Nagai | C01B 32/963 |
| 2018/0304374 | A1* | 10/2018 | Tanabe | B22F 9/14 |

\* cited by examiner

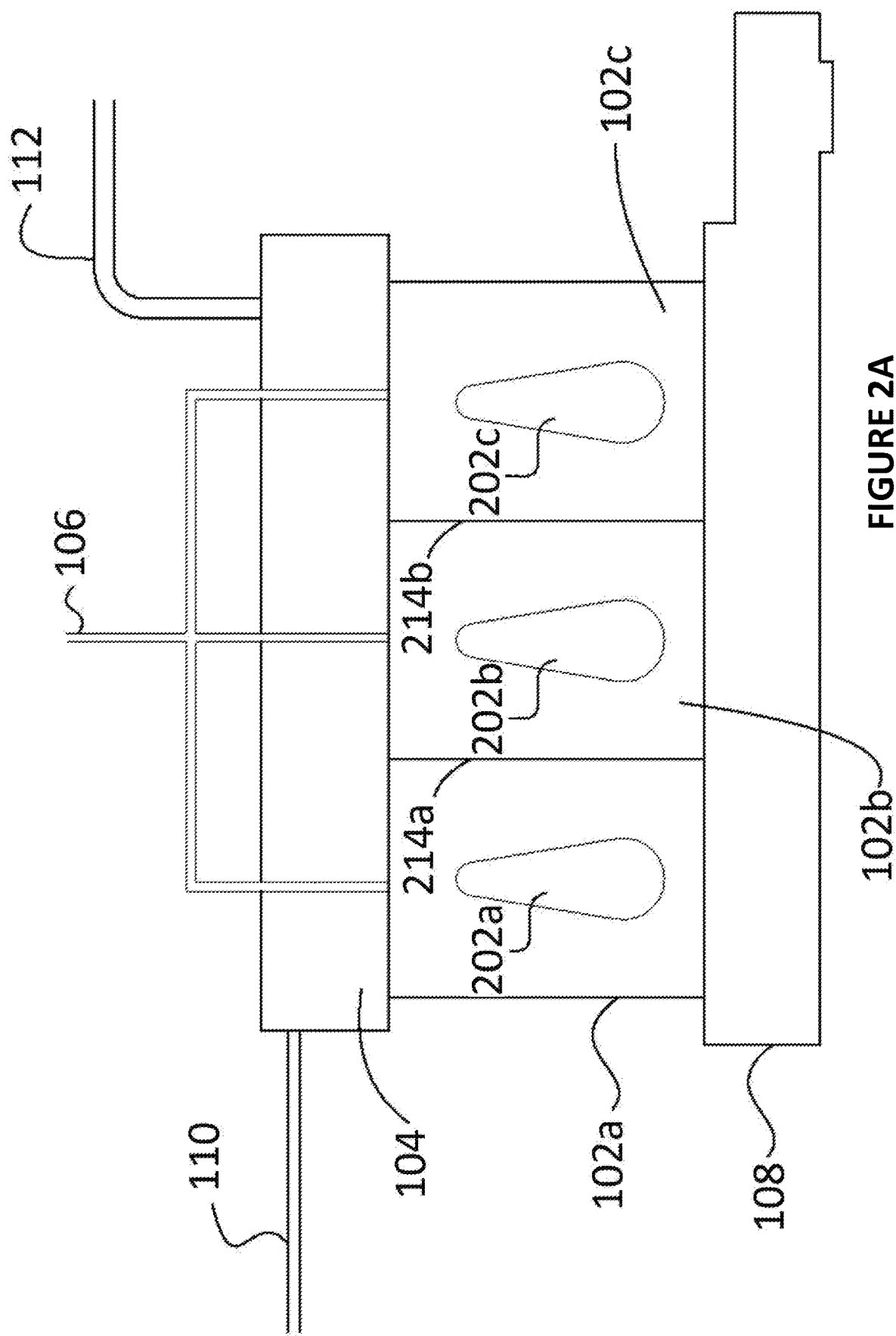

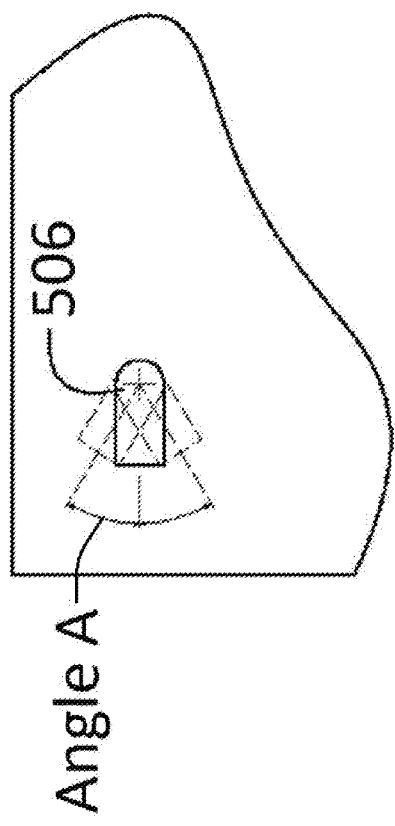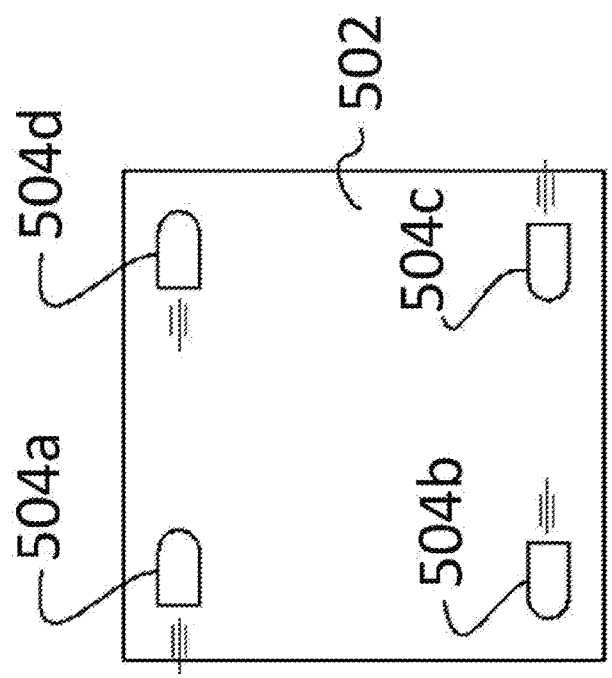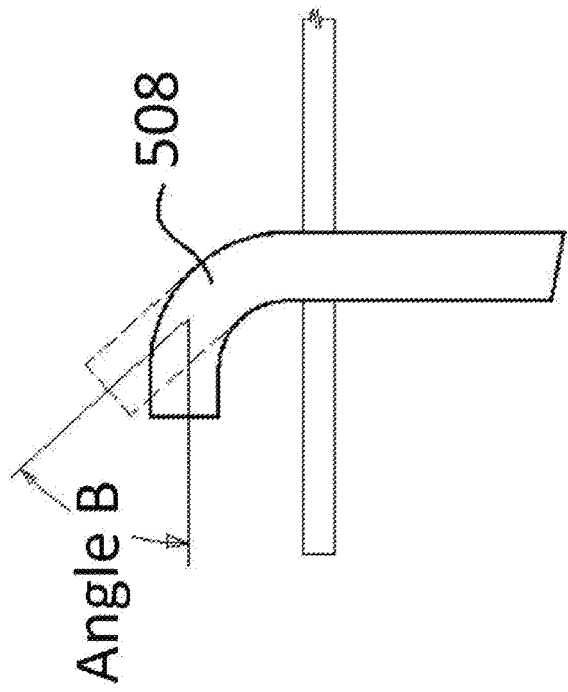

SYSTEM AND APPARATUS FOR PROCESSING MATERIAL TO GENERATE SYNGAS WITH A MULTI-PHASE POWER SOURCE

CROSS-REFERENCE TO RELATED APPLICATION

The present application claims the benefit under 35 U.S.C. § 120, as a continuation of PCT Patent Application Serial No. PCT/CA2015/000564, filed on Nov. 3, 2015 entitled "SYSTEM AND METHOD FOR PROCESSING MATERIAL TO GENERATE SYNGAS IN A MODULAR ARCHITECTURE" by Gordon FRASER et al., hereby incorporated by reference herein.

FIELD OF THE INVENTION

The invention relates generally to processing material to generate syngas and, more particularly, to system and apparatus for processing material to generate syngas with a multi-phase power source.

BACKGROUND

Disposal of Municipal Solid Waste (MSW) and Municipal Solid Sludge (MSS) are significant issues throughout the world, and especially in the developed world. The traditional techniques of either burying or incinerating MSW and MSS are resulting in significant problems. Landfills are increasingly running out of space and there is becoming a large requirement to truck huge amounts of MSW/MSS to distant locations due to the public's unwillingness to have landfills in their neighborhood.

The environmental impact of dumping the MSW and MSS and/or incinerating it in a traditional fashion are enormous with toxins leaching into the soil surrounding landfills and potentially carcinogenic elements entering the air during incineration. The public interest in environmentally acceptable solutions is growing and the push has been in most developed countries to Reduce, Reuse and Recycle in order to limit the MSW that makes it to the landfills and reduce the energy used in dealing with it.

In some situations, benefits have been gained during the processing of MSW and MSS. During incineration, there is often reuse of the heat generated in order to create electricity or heat one or more facilities. In landfills, there have been successful attempts to capture methane that is released in the breakdown of the MSW over time. This methane can then be used in a combustion chamber to create heat energy or within a chemical process to form more complicated compounds. The problem is these solutions do not solve the underlying environmental problems and do not come close to properly capturing the energy within the MSW and MSS.

One technology that has been developed to better process MSW is called plasma arc gasification. In plasma arc gasification, a plasma arc is generated with electrical energy in order to reduce complex carbon-containing molecules into smaller constituent molecules. This molecular breakdown occurs without the presence of oxygen, ensuring that combustion does not occur. The process uses the energy from the plasma arc to molecularly breakdown the complex carbon compounds into simpler gas compounds, such as carbon monoxide CO and carbon dioxide $CO_2$, short chain hydrocarbons and solid waste (slag). The process has been intended to reduce the volumes of MSW being sent to landfill sites and to generate syngas, a useful gas mixture, as an output.

Syngas describes a gas mixture that contains varying amounts of hydrogen $H_2$, carbon monoxide CO, and carbon dioxide $CO_2$, generated through the gasification of a carbon-containing compound. Syngas is combustible, though with typically less than half the energy density of natural gas. It is used as a fuel source or as an intermediate product for the creation of other chemicals. When used as fuel, coal is often used as the source of carbon by the following reactions:

$$C+O_2 \rightarrow CO_2$$

$$CO_2+C \rightarrow 2CO$$

$$C+H_2O \rightarrow CO+H_2$$

This is a mature technology that has seen a renewed interest as a cleaner method of combusting coal than the traditional use of solid coal. When used as an intermediate product in the production of other chemicals such as ammonia, natural gas is typically used as the feed material, since methane has four hydrogen atoms which are desirable for syngas production and methane makes up more than 90% of natural gas. The following steam reforming reaction is used commercially:

$$CH_4+H_2O \rightarrow CO+3H_2$$

The traditional syngas generation technologies using coal and natural gas as feed inputs differ from plasma arc gasification in that they occur within a controlled oxygen environment whereas the plasma arc gasification occurs in an oxygen-free environment. Though designated oxygen-free, through the molecular breakdown of input material, there will be the production of small quantities of oxygen within the process. Further, the coal and natural gas techniques use consistent input materials which results in consistent syngas composition, while plasma arc gasification implementations to date typically use MSW as input material in which feedstock variability leads to syngas variability.

Unfortunately, thus far, there have been a number of limiting aspects of the technology. Firstly, most implementations of the technology have not been designed to manage the high flow rate of MSW that would be required in a commercial facility. Further, the conversion techniques used have led to high levels of contaminant compounds such as tars, rather than the full conversion to hydrogen $H_2$, carbon monoxide CO, carbon dioxide $CO_2$ and hydrocarbons (C1 to C4s). The inconsistent nature of the MSW input material has led to high variability in the quality of the generated syngas. Yet further, high levels of energy are consumed in the creation of the plasma arc and, in some instances, in drying the MSW prior to processing due to moisture limits on the input materials, while the generated syngas has a low calorific value, typically less than half of the BTU content of natural gas. These concerns have limited this technology, despite the significant benefits of converting MSW into a valuable product such as syngas.

One overriding issue with the technology as presently implemented is the capital costs of building the reactors necessary to process the MSW. In particular, in some implementations, the reactor chamber is made from cast components that require curing. These elements can increase costs. Further, the reactor chamber is normally kept at a high pressure which requires additional investment to strengthen the materials used in the reactor chamber and the peripherals and maintenance costs to maintain a tight seal within the system.

Against this background, there is a need for solutions that will mitigate at least one of the above problems, particularly enabling the generation of syngas from input material such as MSW and/or MSS in an efficient manner.

SUMMARY OF THE INVENTION

According to a first broad aspect, the present invention is a system comprising: a plurality of primary reactor chambers and a secondary reactor chamber. The primary reactor chambers are operable to receive material; each of the primary reactor chambers comprising a plurality of electrodes at least partially protruding into the respective primary reactor chamber. The electrodes are operable to generate an arc capable to generate first-stage gas from breakdown of the material within the respective primary reactor chamber when electricity is applied to the electrodes. The secondary reactor chamber is operable to receive the first-stage gas generated within each of the plurality of primary reactor chambers and to receive water vapour. The gas generated within the plurality of primary reactor chambers combine and interact with the water vapour to form second-stage gas.

In some embodiments of the present invention, the system further comprises at least one first-stage gas pipe connected between each of the primary reactor chambers and the secondary reactor chamber. The first-stage gas generated within each of the primary reactor chambers may be output to the secondary reactor chamber via the respective first-stage gas pipe. Each of the first-stage gas pipes may comprise a portion protruding into the secondary reactor chamber that together are adapted to direct the flow of first-stage gas output from the primary reactor chambers to generate turbulence within the secondary reactor chamber, to generate a cyclical pattern within the secondary reactor chamber and/or to generate a gas mixing interference pattern within the secondary reactor chamber. In some cases, each of the first-stage gas pipes comprise a portion protruding into the secondary reactor chamber that changes a direction of flow for the first-stage gas output from the primary reactor chamber; such as changing the direction of flow for the first-stage gas output from the primary reactor chamber from a substantially vertical flow to a substantially horizontal flow. In some implementations, the system may comprise a plurality of first-stage gas pipe connected between each of the primary reactor chambers and the secondary reactor chamber. In this case, the first-stage gas generated within each of the primary reactor chambers is output to the secondary reactor chamber via the respective first-stage gas pipes.

In some embodiments of the present invention, the primary reactor chambers are connected together within a single housing. The housing may be a rectangular prism and may be connected to the secondary reactor chamber. The secondary reactor chamber may be integrated above the housing. In some implementations, aggregate is generated in each of the primary reactor chambers during breakdown of the material and the system further comprises a single aggregate removal system for each of the primary reactor chambers. The aggregate removal system may comprise a conveyor integrated below all of the plurality of primary reactor chambers. In one embodiment, the plurality of primary reactor chambers are connected below the secondary reactor chamber and each of the primary reactor chambers is connected to at least one material pipe adapted for material to flow into the corresponding primary reactor chamber. The material pipes connected to the primary reactor chambers may each traverse the secondary reactor chamber.

In some embodiments of the present invention, the plurality of electrodes within each of the primary reactor chambers comprises two electrodes operable to generate the arc when electricity flows from one of the electrodes to the other. The electrodes in a plurality of the primary reactor chambers can be powered by different phases of a multi-phase power source.

In one case, the plurality of primary reactor chambers comprises three primary reactor chambers and the multi-phase power source comprises a three-phase power source with three phase outputs. In this case, each of the phase outputs can be used to power electrodes within a different one of the primary reactor chambers. In another case, the multi-phase power source comprises a three-phase power source with three phase outputs and each of the phase outputs is used to power electrodes within approximately a third of the plurality of primary reactor chambers.

According to a second broad aspect, the present invention comprises a system comprising: at least one primary reactor chamber, a plurality of first-stage gas pipes connected to the primary reactor chamber and a secondary reactor chamber. The primary reactor chamber is operable to receive material and comprises a plurality of electrodes at least partially protruding into the primary reactor chamber. The electrodes are operable to generate an arc capable to generate first-stage gas from breakdown of the material within the primary reactor chamber when electricity is applied to the electrodes. The secondary reactor chamber is operable to receive the first-stage gas from the primary reactor chamber via the first-stage gas pipes and to further receive water vapour. The gas generated within the primary reactor chamber combines and interacts with the water vapour to form second-stage gas. Each of the first-stage gas pipes comprise a portion protruding into the secondary reactor chamber that together are adapted to direct the flow of first-stage gas output from the primary reactor chamber to generate turbulence within the secondary reactor chamber.

Within some implementations, the portions of the first-stage gas pipes protruding into the secondary reactor chamber are together adapted to direct the flow of first-stage gas output from the primary reactor chamber to generate a cyclical pattern within the secondary reactor chamber and/or a gas mixing interference pattern within the secondary reactor chamber. In some cases, the portion of the first-stage gas pipes protruding into the secondary reactor chamber each comprise a curved pipe that change a direction of flow for the first-stage gas output from the primary reactor chamber. The curved pipes corresponding to each of the first-stage gas pipes may be adapted to be manually adjusted substantially horizontally and/or manually adjusted substantially vertically. The portion of the first-stage gas pipes protruding into the secondary reactor chamber each may comprise a curved pipe that changes a direction of flow for the first-stage gas output from the primary reactor chamber from a substantially vertical flow to a substantially horizontal flow. In some implementations, the system comprises first and second primary reactor chambers.

According to a third broad aspect, the present invention is a system comprising: a plurality of primary reactor chambers. The primary reactor chambers are operable to receive material. Each of the primary reactor chambers comprises two electrodes at least partially protruding into the respective primary reactor chamber, the electrodes operable to generate an arc capable to generate first-stage gas from breakdown of the material within the respective primary reactor chamber when electricity flows from one of the electrodes to the other. The electrodes in a plurality of the primary reactor chambers are powered by different phases of a multi-phase power source.

In some embodiments of the present invention, the system comprises the multi-phase power source. The plurality of primary reactor chambers may comprise three primary reactor chambers and the multi-phase power source may comprise a three-phase power source with three phase outputs. In this case, each of the phase outputs may be used to power electrodes within a different one of the primary reactor chambers. In another case, the multi-phase power source comprises a three-phase power source with three phase outputs and each of the phase outputs is used to power electrodes within approximately a third of the plurality of primary reactor chambers. In some implementations, the system further comprises a secondary reactor chamber operable to receive the first-stage gas generated within each of the plurality of primary reactor chambers and to receive water vapour. The gas generated within the plurality of primary reactor chambers may combine and interact with the water vapour to form second-stage gas.

These and other aspects of the invention will become apparent to those of ordinary skill in the art upon review of the following description of certain embodiments of the invention in conjunction with the accompanying drawings.

BRIEF DESCRIPTION OF THE DRAWINGS

A detailed description of embodiments of the invention is provided herein below, by way of example only, with reference to the accompanying drawings, in which:

FIG. 2A is a logical depiction of modular reactor chambers within the material processing system of FIG. 1A according to one embodiment of the present invention;

FIGS. 5A, 5B and 5C are top views of alternative configurations of first-stage gas pipes from the primary reactor chamber into the secondary reactor chamber.

DETAILED DESCRIPTION OF EMBODIMENTS

The present invention is directed to system and apparatus for processing material to generate syngas in a modular architecture. As will be described herein below, the system of the present invention includes a number of different distinct mechanical elements that together allow for an efficient process flow from material input to syngas output. The system, according to some embodiments of the present invention, is designed to allow for processing of material in a controlled manner through management of various aspects of the process including, but not limited to, free radical generation, water-gas shift, gas flow control and arc electrical power management.

The key material input needed to generate syngas is carbonaceous material (i.e. material containing carbon-based molecules). In various embodiments, the input material may be a wide range of carbonaceous materials or carbonaceous material mixed with extraneous non-carbonaceous material. In the case that it is a mixture of material, the extraneous material may be sorted out or processed into a waste output as will be described. In some embodiments, the input material may be Municipal Solid Waste (MSW) and/or Municipal Solid Sludge (MSS). In other embodiments, the input material may comprise construction waste (ex. wood, plywood, chip board, shingles, etc.), agricultural waste (ex. wood chips, plant matter, mulch, other biomass, etc.), rubber tires, medical waste, coal, oil, waxes, tars, liquids such as water containing carbonaceous material and/or gases such as carbon dioxide. In some embodiments, there may be limits on the proportion of the material that can comprise liquids and/or gases. Although examples of input material are provided, it should be understood that the scope of the present invention should not be limited by these example materials. Other material may be used as an input to the system of the present invention including, but not limited to, solid carbonaceous material, semi-solid carbonaceous material and liquid carbonaceous material and other material (solid, liquid or gaseous) that may contribute to syngas generation.

In the case of the input material being MSW or another input material that may have a mixture of carbonaceous material and extraneous material, a pre-sort may be performed. For instance, recyclable materials (ex. metals, glass, useable plastics, etc) and hazardous materials (ex. radioactive materials, batteries, fluorescent light bulbs, etc.) may be pre-sorted out. Extraneous material that is input to the system as will be described will effectively result in additional waste. For example, as will be described, metals may be melted and form pellets and other non-organic material (ex. glass, ceramics, etc.) may be melted and form vitrified granular material that may encapsulate heavy metals.

Figure 1A:
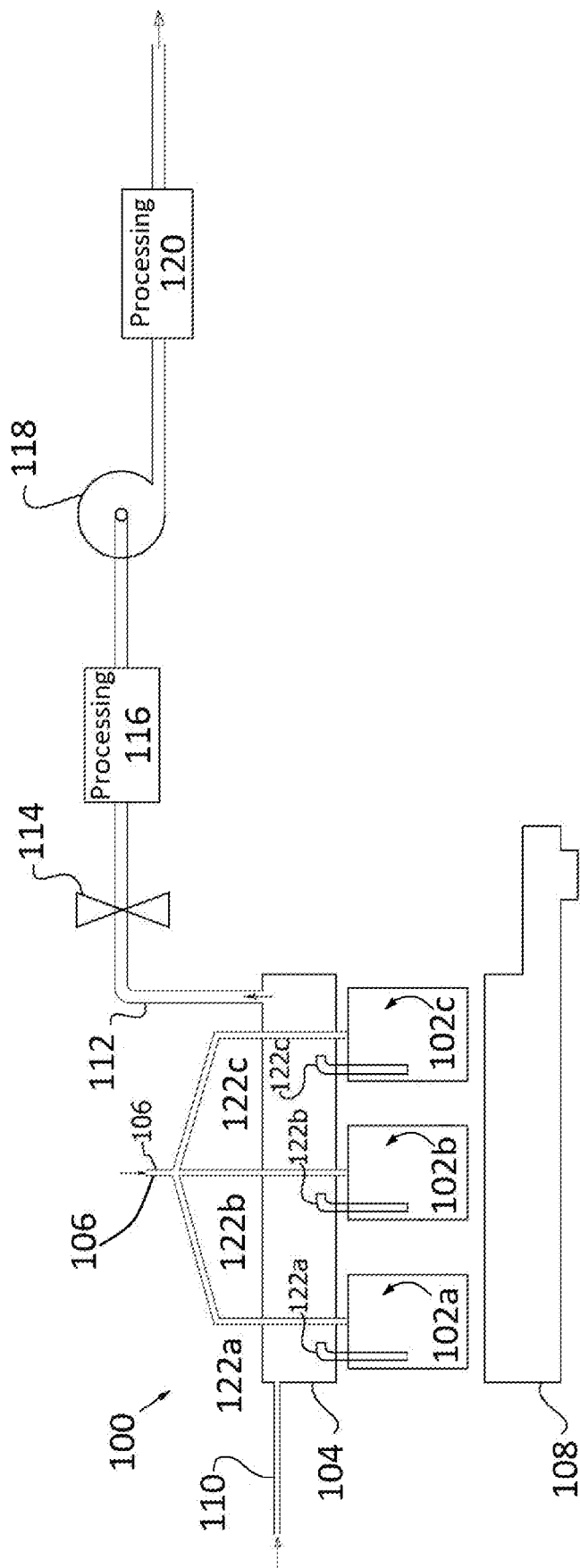
FIG. 1A is a system diagram of a material processing system according to an embodiment of the present invention.

FIG. 1A is a system diagram of a material processing system 100 according to an embodiment of the present invention. As shown, the material processing system 100 comprises a plurality of individual primary reactor chambers 102a, 102b, 102c coupled to a common secondary reactor chamber 104 that operates as a water-gas shift chamber. Each of the primary reactor chambers 102a, 102b, 102c is coupled to an independent pipe of a feedstock system 106 and is further coupled to an aggregate removal system 108. Operation of the primary reactor chambers 102a, 102b, 102c and the secondary reactor chamber 104 will be described in detail below with reference to FIGS. 2A and 2B. In general, the flow of operation within the system comprises: feedstock is input to the primary reactor chambers 102a, 102b, 102c via feedstock system 106, aggregate is removed from the primary reactor chambers 102a, 102b, 102c via the aggregate removal system 108 and first-stage gas is extracted from the primary reactor chambers 102a, 102b, 102c to the secondary reactor chamber 104. The secondary reactor chamber 104 comprises a water vapour entry pipe 110 for adding water in gaseous form (i.e. steam) to the secondary reactor chamber 104, also known as the water-gas shift chamber, and a second-stage gas pipe 112 for removing second-stage gas from the secondary reactor chamber 104.

The removal of the second-stage gas from the secondary reactor chamber 104 is controlled by a flow control valve 114 which can maintain a desired pressure within the reactor system and a blower element 118 which can operate to move the gas along the system at a desired rate. The final syngas output from the material processing system 100 may be extracted and stored for later use or may be piped to a further system for utilization. Processing of the second-stage gas may be completed within processing element 116 between the flow control valve 114 and the blower element 118 and can further be completed within processing element 120 after the blower element 118. The processing elements 116 and 120 may perform a number of operations including, but not limited to, lowering the temperature of the gas, reducing the particulate content in the gas, and removing contaminants from the gas. In one embodiment, the processing element 116 and/or the processing element 120 comprise a temperature reduction unit such as one or more heat exchangers that lower the temperature of the gas and remove water vapour by condensation; a particulate removal unit which may comprise a cyclonic separator; and/or a contaminant removal unit for removing chlorine compounds, partial removal of sulphur compounds and removal of metals. The contaminant removal unit may comprise an acid gas scrubber and sintered metal filter elements. In other embodiments, the contaminant removal unit may comprise other elements as are known in the art for removing contaminants from gases. The acid gas scrubber may also indirectly remove particulate matter.

As shown in FIG. 1A, the feedstock system 106 is a piping system that includes a main pipe element and a separate pipe for each primary reactor chamber 102a, 102b, 102c. The feedstock system 106 may comprise a compressing element (not shown) for compressing the feedstock upon entry and one or more conveyor units (described with reference to FIG. 1B) for moving the feedstock from a storage element (not shown) to the plurality of primary reactor chambers 102a, 102b, 102c and potentially further compressing the feedstock. In some embodiments, as shown in FIG. 1A, the feedstock pipes coupled to the primary reactor chambers 102a, 102b, 102c are coupled through the secondary reactor chamber 104. This piping architecture can allow the feedstock to use gravity to fall into the primary reactor chambers 102a, 102b, 102c while still having the secondary reactor chamber 104 to be vertically above the primary reactor chambers 102a, 102b, 102c.

Figure 1B:
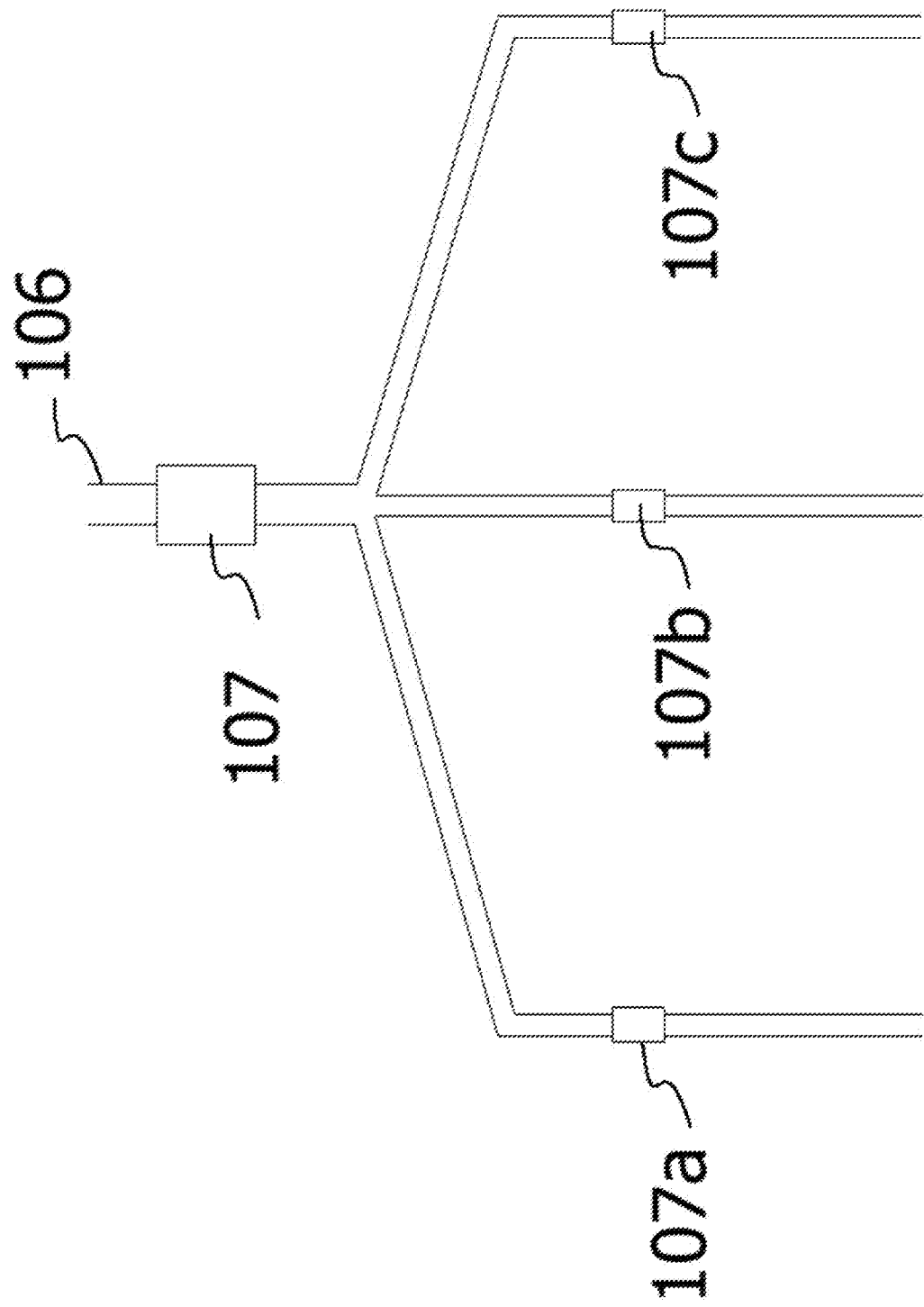
FIG. 1B is a diagram of a feedstock system implemented within the material processing system of FIG. 1A according to one embodiment of the present invention.

FIG. 1B illustrates the feedstock system 106 implemented according to one embodiment of the present invention in which a primary conveyor unit 107 is implemented within the feedstock system 106 prior to the splitting of the separate pipes for each primary reactor chamber 102a, 102b, 102c and each separate pipe comprises a corresponding secondary conveyor unit 107a, 107b, 107c that controls the inputting of feedstock into its primary reactor chamber 102a, 102b, 102c. The primary conveyor unit 107 operates to move feedstock material to a central location and may be operated at a speed sufficient to ensure the secondary conveyor units 107a, 107b, 107c have sufficient feedstock material to properly distribute feedstock to their corresponding primary reactor chambers 102a, 102b, 102c. In one embodiment, the primary conveyor unit 107 is operated at a speed that is the sum of the speeds of the secondary conveyor units 107a, 107b, 107c. Each of the secondary conveyor units are configured to control the input of material into their corresponding primary reactor chamber 102a, 102b, 102c to match the energy input to the primary reactor chamber. As will be described, energy is applied to electrodes within each of the primary reactor chambers 102a, 102b, 102c to create a corresponding arc that is operable to break down the feedstock material input to the chamber. By matching the input of the feedstock material using the corresponding secondary conveyor unit 107a, 107b, 107c with the energy input to the primary reactor chambers 102a, 102b, 102c, wastage of energy can be mitigated while ensuring substantially all feedstock material is broken down during processing.

In one implementation, each of the conveyor units 107, 107a, 107b, 107c may comprise a motor driven screw conveyor. In this case, the conveyor units 107, 107a, 107b, 107c may further operate to compress the feedstock material. In some embodiments, control of the conveyor units 107a, 107b, 107c may be independently controlled; for instance, to match the speed of entry of the feedstock material within the primary reactor chambers 102a, 102b, 102c to the energy input to the primary reactor chambers 102a, 102b, 102c. In other embodiments, the speed of the conveyor units 107, 107a, 107b, 107c may be commonly controlled and, thus, speed of input of the feedstock material may be the same across all primary reactor chambers 102a, 102b, 102c. Further, in some embodiments, the primary conveyor unit 107 may be removed and each of the secondary conveyor units 107a, 107b, 107c may move feedstock material from a central storage (not shown) to their respective primary reactor chambers 102a, 102b, 102c. In other embodiments, the secondary conveyor units 107a, 107b, 107c may be removed and the primary conveyor unit 107 operates to move the feedstock material into all of the primary reactor chambers 102a, 102b, 102c.

After inputting of feedstock into the primary reactor chambers 102a, 102b, 102c, the feedstock is broken down into first-stage gas with the use of an arc generated between two electrodes within each of the primary reactor chambers 102a, 102b, 102c which will be described with reference to FIGS. 2A and 2B. The first-stage gas generated through this breakdown of the feedstock material may comprise hydrogen, carbon monoxide, carbon dioxide, short chain hydrocarbons (C1-C4), small amounts of oxygen and nitrogen, and contaminants such as carbon particulate, sulphur compounds and chlorine compounds. This first-stage gas from each of the primary reactor chambers 102a, 102b, 102c is fed to the secondary reactor chamber 104 via at least one respective first-stage gas pipe 122a, 122b, 122c. The first-stage gas pipes 122a, 122b, 122c may take a number of architectures. In some embodiments, as will be described, the first-stage gas pipes 122a, 122b, 122c may be configured to increase velocity of gas within the secondary reactor chamber 104.

In operation, first-stage gas from the primary reactor chambers 102a, 102b, 102c is mixed with water vapour from the water vapour entry pipe 110 within the secondary reactor chamber 104. The addition of the water vapour results in increased molar quantity of hydrogen while consuming carbon with the chemical equation: $C+H_2O \rightarrow CO+H_2$ and consuming carbon monoxide with the chemical equation: $CO+H_2O \rightarrow CO_2+H_2$. The water vapour also lowers the temperature of the first-stage gas. The end result is that the second-stage gas that exits the secondary reactor chamber 104 via second-stage gas pipe 112 comprises an increased quantity of hydrogen and carbon dioxide, a lower quantity of carbon monoxide and less particulate material such as carbon and is at a lower temperature compared to the first-stage gas that enters the secondary reactor chamber 104.

FIG. 2A is a logical depiction of modular reactor chambers within the material processing system of FIG. 1A according to one embodiment of the present invention. As shown in FIG. 2A, the primary reactor chambers 102a, 102b, 102c are implemented adjacent to each other and below the secondary reactor chamber 104. The feedstock system 106 is implemented with a pipe through the secondary reactor chamber 104 to each of the primary reactor chambers 102a, 102b, 102c and the aggregate removal system 108 is implemented below the primary reactor chambers 102a, 102b, 102c. Each of the primary reactor chambers 102a, 102b, 102c has a corresponding hot zone 202a, 202b, 202c resulting in operation from an arc formed between a plurality of electrodes in operation. The size of the hot zones 202a, 202b, 202c are influenced by the energy input and the characteristics of the electric arcs created. The hot zones 202a, 202b, 202c enable the breakdown of the feedstock into first-stage gas within each of the primary reactor chambers 102a, 102b, 102c. The volume of the hot zones 202a, 202b, 202c dictates the throughput of feedstock material that can be processed within the primary reactor chambers 102a, 102b, 102c, the larger the volume of the high temperature zone, the more material can be processed within a set period of time.

Figure 2B:
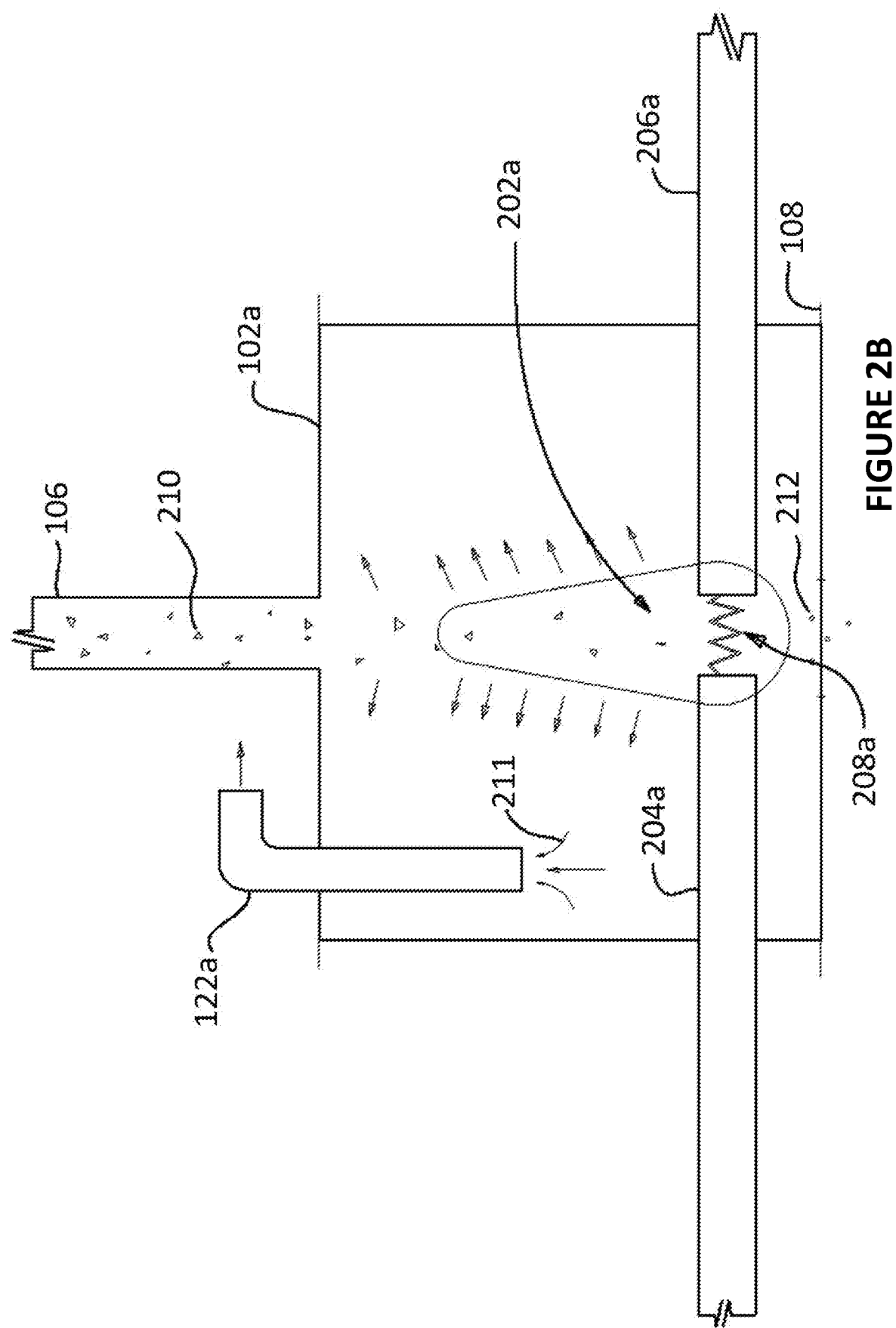
FIG. 2B is a logical depiction of a primary reactor chamber within the material processing system of FIG. 1A illustrating the flow of material and gas according to one embodiment of the present invention.

FIG. 2B is a logical depiction of the primary reactor chamber 102a within the material processing system of FIG. 1A illustrating the flow of material and gas according to one embodiment of the present invention. As shown, the primary reactor chamber 102a comprises first and second electrodes 204a, 206a which extend from outside the chamber into the lower portion of the chamber from opposite sides. Tips of the two electrodes 204a, 206a are separated within the center of the primary reactor chamber 102a by a desired distance or range of distances that can allow an arc 208a to form between the electrodes 204a, 206a when electricity flows from the first electrode 204a to the second electrode 206a. The arc 208a formed between the electrodes 204a, 206a protruding into the primary reactor chamber 102a creates the hot zone 202a. The hot zone 202a may comprise a number of heat profiles with higher temperatures closer to the arc 208a and decreasing heat as the distance from the arc 208a increases.

In operation, feedstock material 210 is input to the primary reactor chamber 102a via the feedstock system 106 near the top of the primary reactor chamber 102a and the feedstock 210 drops through the primary reactor chamber 102a due to gravity. As the feedstock 210 drops, it enters a portion of the hot zone 202a that is at a temperature sufficient to chemically breakdown a portion of the feedstock 210. The chemical breakdown results in a composition of gas 211 forming along with aggregate 212. Within a variety of zones of temperature within the hot zone 202a, different chemical breakdowns may occur with different mixes of components within the gas 211 depending on the feedstock material and the temperatures within the hot zone 202a. The aggregate 212 drops through the primary reactor chamber 102a due to gravity into the aggregate removal system 108 and the gas 211 generated within the primary reactor chamber 102a exits through a first-stage gas pipe such as pipe 122a into the secondary reactor chamber 104.

Each of the primary reactor chambers 102a, 102b, 102c of FIG. 2A comprises a corresponding pair of first and second electrodes that protrude from outside of the chambers 102a, 102b, 102c into a central location within the lower portion of the chambers 102a, 102b, 102c. In operation, each of the primary reactor chambers 102a, 102b, 102c has a separate arc formed when electricity flows from one electrode to the other electrode within the chambers 102a, 102b, 102c. These arcs create the respective hot zones 202a, 202b, 202c used to breakdown the feedstock into first-stage gas and aggregate in each of the primary reactor chambers 102a, 102b, 102c. In the modular architecture of FIG. 2B, the aggregate from each of the primary reactor chambers 102a, 102b, 102c is dropped into the aggregate removal system 108 which is shared across the primary reactor chambers 102a, 102b, 102c and the first-stage gas generated within the chambers 102a, 102b, 102c is piped separately into the common secondary reactor chamber 104. As shown in FIG. 2A, a first wall 214a forms a barrier between the primary reactor chambers 102a, 102b and a second wall 214b forms a barrier between the primary reactor chambers 102b, 102c. These walls 214a, 214b in some embodiments may be removable in order to generate a single larger primary reactor chamber containing a plurality of independent sets of electrodes generating a plurality of arcs for breakdown of the feedstock material.

Figure 3A:
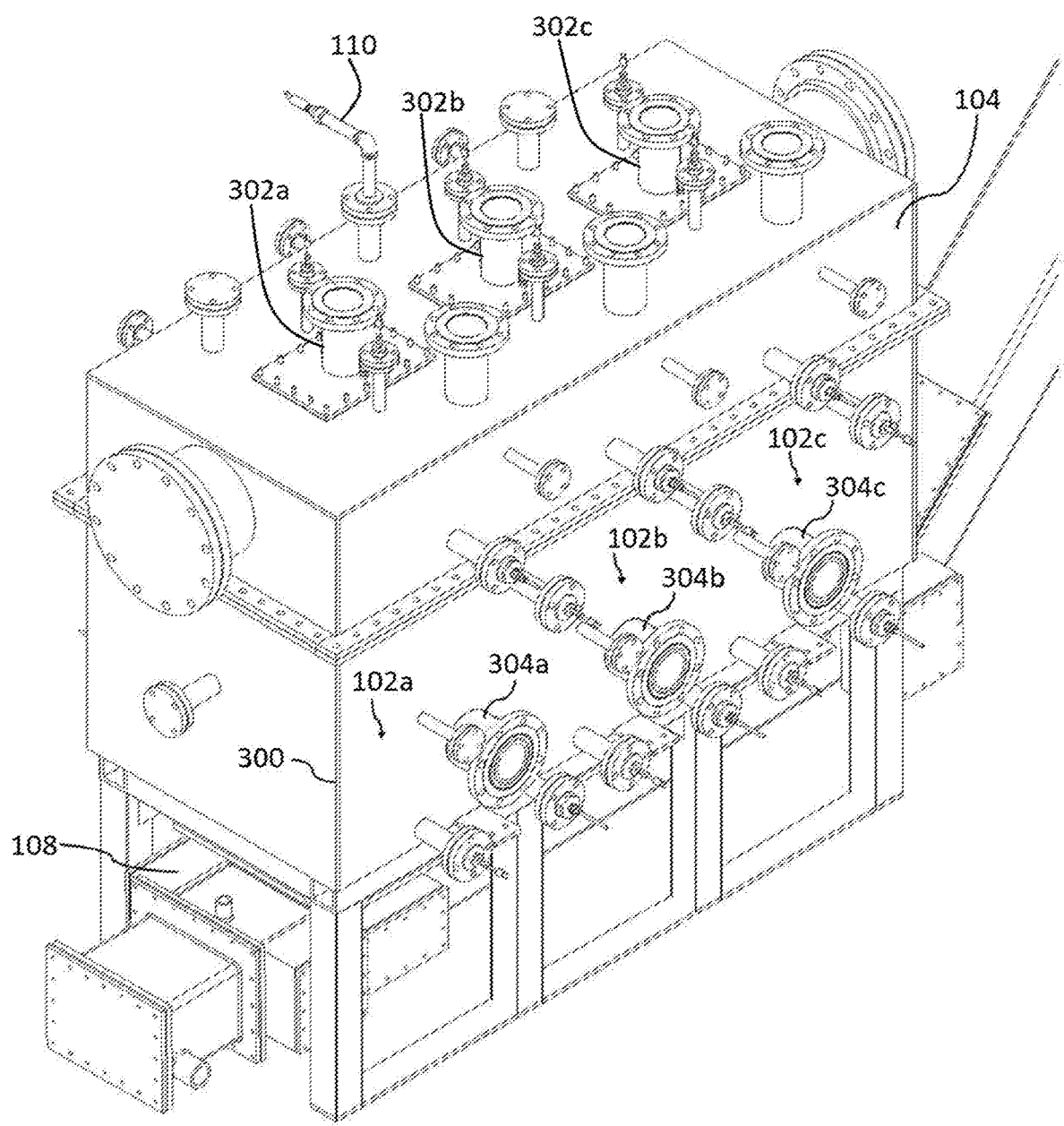
FIGS. 3A and 3B are a top angular view and a cross-sectional side view respectively of modular reactor chambers according to an embodiment of the present invention.
Figure 3B:
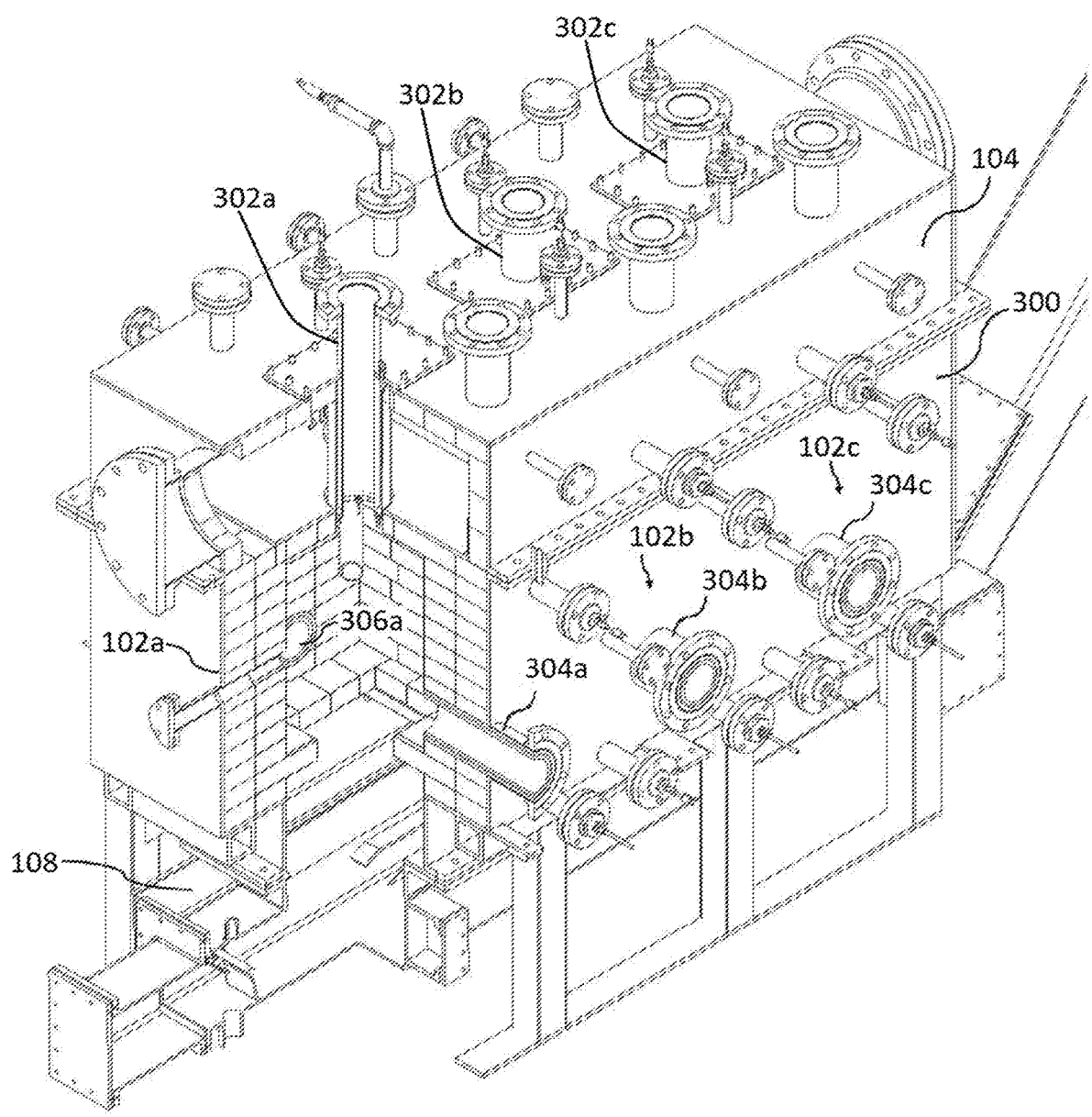

FIGS. 3A and 3B are a top angular view and a cross-sectional side view respectively of modular reactor chambers according to an embodiment of the present invention. FIGS. 3A and 3B are shown as one sample mechanical implementation of the modular architecture depicted in FIGS. 1 and 2A. In this design, the primary reactor chambers 102a, 102b, 102c are implemented within a single rectangular prism housing 300 which is connected to the secondary reactor chamber 104 which is also implemented as a rectangular prism. The aggregate removal system 108 in this embodiment comprises a conveyor system.

As depicted, the feedstock system 106 comprises feedstock pipes 302a, 302b, 302c corresponding to each of the primary reactor chambers 102a, 102b, 102c for feeding in the feedstock material to the primary reactor chambers 102a, 102b, 102c. As previously described, the feedstock pipes 302a, 302b, 302c traverse through the secondary reactor chamber 104 but do not release any feedstock within the secondary reactor chamber 104. This structure allows for the feedstock to enter the primary reactor chambers 102a, 102b 102c at the top of the chambers and allows the gas to flow to the secondary reactor chamber 104 integrated directly above the primary reactor chambers 102a, 102b, 102c. This allows for a compact design while maximizing the use of gravity to move the feedstock through the primary reactor chambers 102a, 102b, 102c. In alternative embodiments, it should be understood that the feedstock pipes 302a, 302b, 302c may not traverse the secondary reactor chamber 104 as either the feedstock pipes 302a, 302b, 302c may not be implemented into the top of the primary reactor chambers 102a, 102b, 102c and/or the secondary reactor chamber 104 may not be implemented directly above the primary reactor chambers 102a, 102b, 102c.

Each of the primary reactor chambers 102a, 102b, 102c comprises pipes for holding the pair of electrodes used to form their corresponding arcs. In FIG. 3A, electrode pipes 304a, 304b 304c are depicted within the side of the housing 300. Each electrode pipe 304a, 304b, 304c enables a first one of the electrodes within each of the primary reactor chambers 102a, 102b, 102c to protrude into their respective chambers. On the other side of the housing 300, further electrode pipes are implemented to enable the second one of the electrodes within each of the primary reactor chambers 102a, 102b, 102c to protrude into their respective chambers. The electrode pipe 306a which enables the second of the electrodes to protrude into primary reactor chamber 102a is shown in FIG. 3B.

Figure 3C:
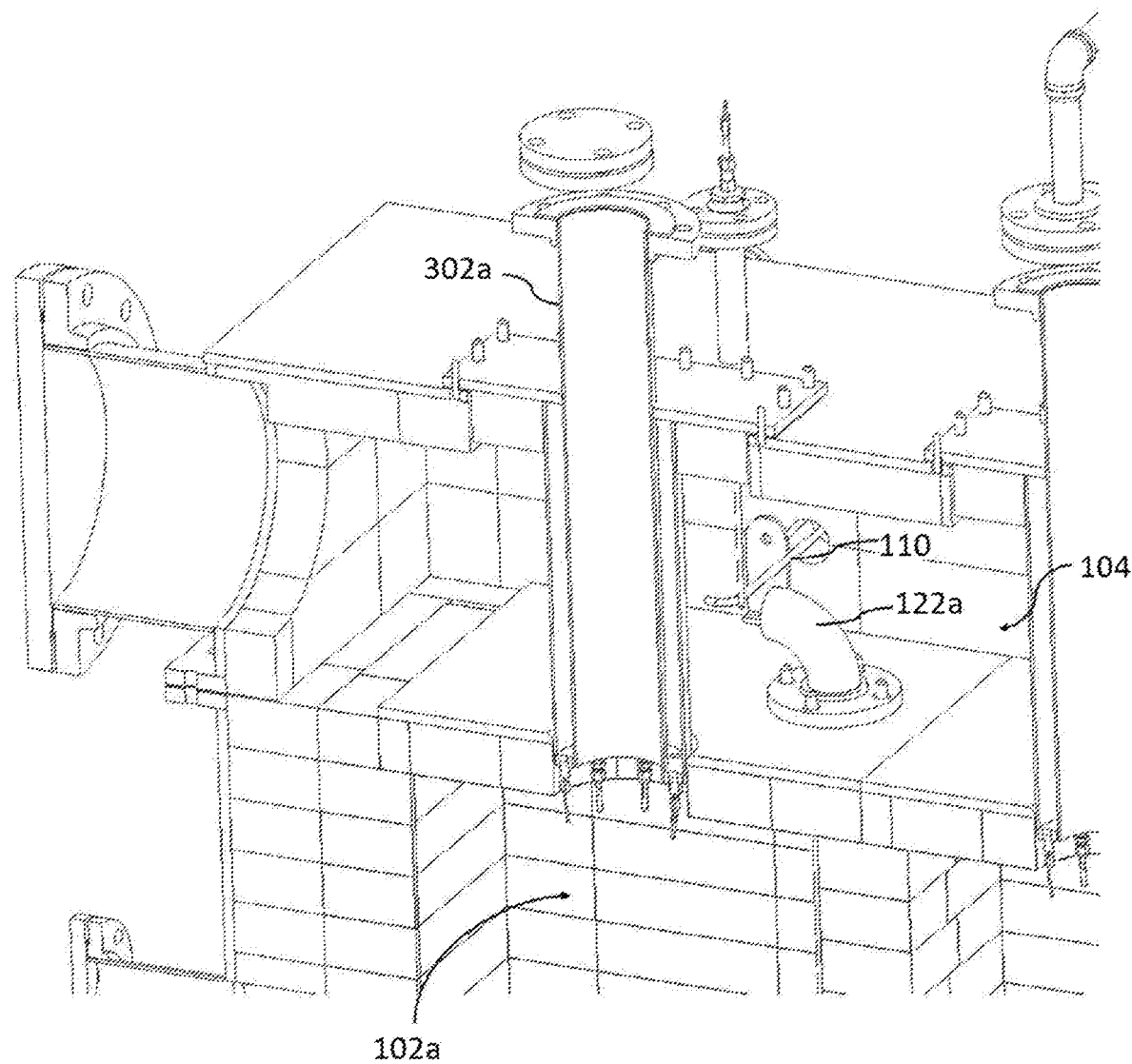
FIG. 3C is a cross-sectional side view of a top portion of a primary reactor chamber and a portion of a secondary reactor chamber according to one embodiment of the present invention.

FIG. 3C is a cross-sectional side view of a top portion of the primary reactor chamber 102a and a portion of the secondary reactor chamber 104 according to one embodiment of the present invention. As shown, the walls of the primary reactor chamber 102a and the secondary reactor chamber 104 may be built with bricks. This structure allows for a more economical design than a structure that requires casted components. Further, FIG. 3C illustrates one implementation for the feedstock pipe 302a which traverses the secondary reactor chamber 104 and illustrates an implementation of the first-stage gas pipe 122a as a curved pipe that directs the flow of gas exiting the primary reactor chamber 102a from a vertical direction to a horizontal direction.

Figure 3D:
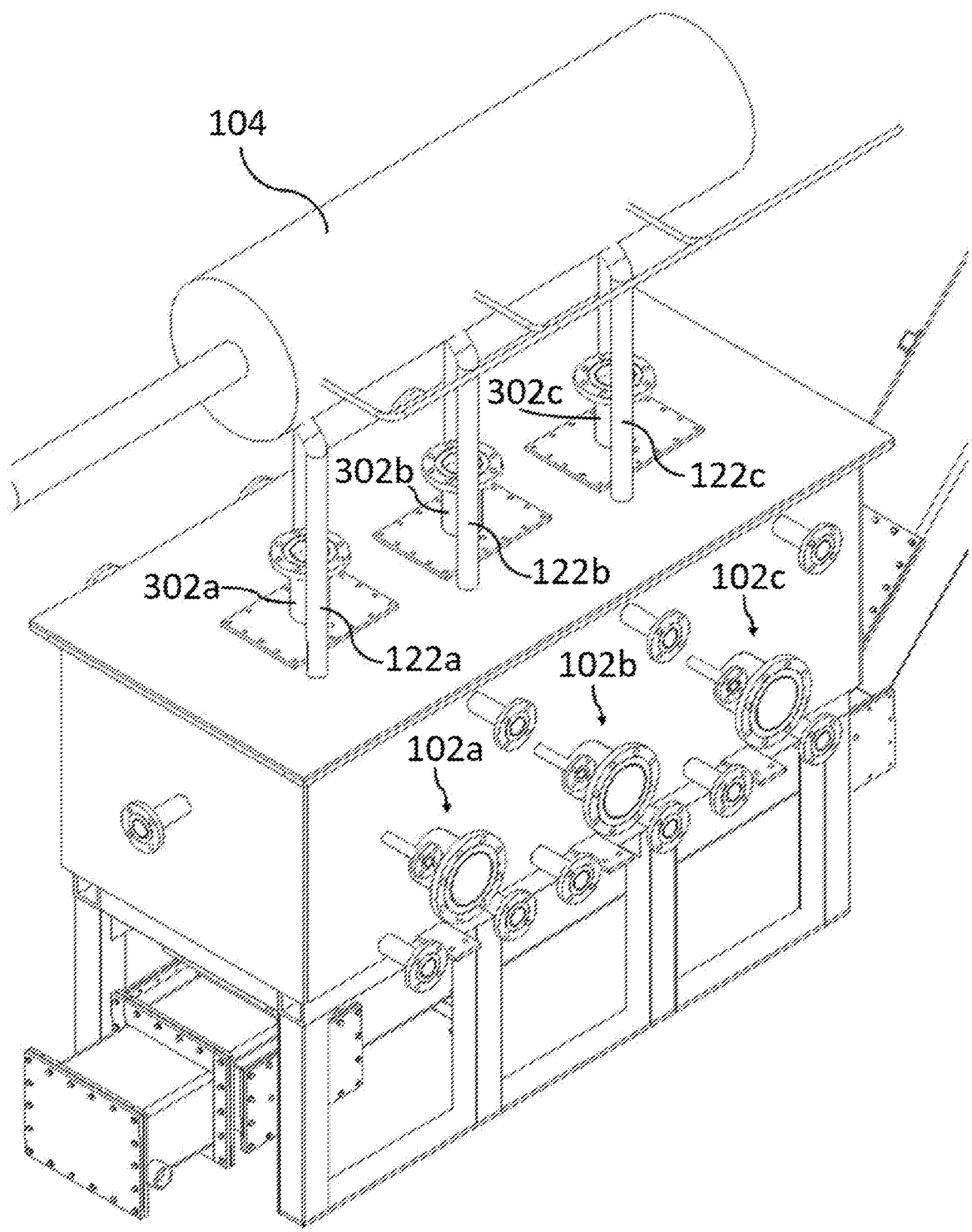
FIGS. 3D and 3E are top angular views of modular reactor chambers according to alternative embodiments of the present invention in which the secondary reactor chamber is physically separate from the primary reactor chambers.
Figure 3E:
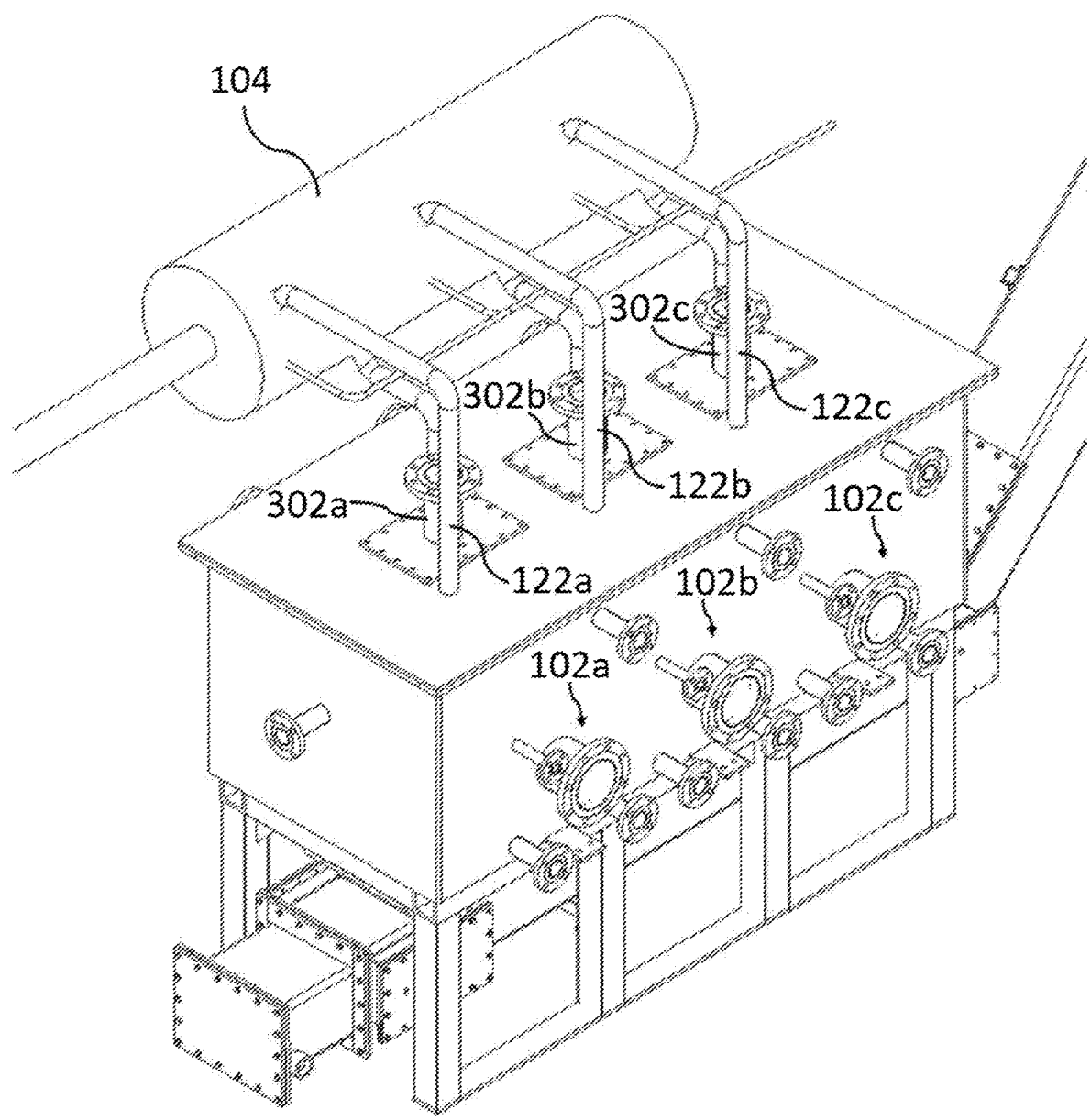

The mechanical designs illustrated within FIGS. 3A, 3B and 3C should be understood to be only sample implementations of the present invention. Modifications to the shape, size, structure and configuration of the reactor chambers could be made within the scope of the present invention. In particular, the shape and composition of the primary and secondary reactor chambers could be modified in some embodiments. Also, the relative locations of the primary and secondary reactor chambers could be modified. For instance, as illustrated in FIG. 3D, the secondary reactor chamber 104 may be implemented in a separate housing physically separate from the housing of the primary reactor chambers 102a, 102b, 102c. In this case, the first-stage gas pipes 122a, 122b, 122c may be elongated and extend from the primary reactor chambers 102a, 102b, 102c via the air or through other housing elements to the secondary reactor chamber 104. Further, the secondary reactor chamber 104 may be implemented in other relative locations compared to the primary reactor chambers 102a, 102b, 102c. In some non-limiting embodiments as illustrated in FIG. 3E, the secondary reactor chamber 104 may be implemented adjacent to the primary reactor chambers 102a, 102b, 102c or indirectly above (i.e. above but not directly above) the primary reactor chambers 102a, 102b, 102c. In some implementations that may use blowers to move first-stage gas, the secondary reactor chamber may even be implemented directly or indirectly below the primary reactor chambers 102a, 102b, 102c or remote from the primary reactor chambers 102a, 102b, 102c.

Although depicted as three primary reactor chambers 102a, 102b, 102c in FIGS. 1A, 2A, 3A and 3B, it should be understood that the material processing system 100 of the present invention may comprise 2, 3 or more modular primary reactor chambers that share a secondary reactor chamber 104 and/or an aggregate removal system 108. In some embodiments, the configuration of the first-stage gas pipes within the secondary reactor chamber 104 could allow for aspects of the invention to be implemented with only a single primary reactor chamber connected to a secondary reactor chamber.

Although depicted with only two electrodes implemented within each of the primary reactor chambers, the number of electrodes could be increased in some embodiments. Increasing the number of electrodes within the primary reactor chambers can allow for more than one arc to be formed and potentially an increased size of the heat zone being formed. An increased heat zone can allow an increased amount of feedstock material to be processed in a set amount of time. An advantage of using only two electrodes within each primary reactor chamber is the simplicity in triggering an arc to be formed. With a plurality of electrodes, the distances between each pair of electrode and the power input to the electrodes may need to be adjusted to trigger each of the arcs and it may be difficult to trigger a plurality of arcs simultaneously. The more arcs that are desired to be formed, the more complex the process of adjusting the electrodes and input power becomes.

In one embodiment, the desired pressure within the reactor system is a low pressure level less than 15 psi. This low pressure aspect allows the cost of elements comprising the primary and secondary reactor chambers to be lower as the strength of the materials used must be greater in a high pressure system. Further, cost of sealants and maintenance of sealants required in a high pressure system increases costs of operation.

The configuration of first-stage gas pipes within the secondary reactor chamber 104 can affect the quality of the second-stage gas that is produced. Building in turbulence within the secondary reactor chamber 104 can increase the mix of the first-stage gas from the primary reactor chambers 102a, 102b, 102c and the water vapour. An improved mix increases the chemical reactions that take place, thus increasing the amount of hydrogen created and the reduction of carbon particulate. There are many configurations for the first-stage gas pipes that can be implemented to increase turbulence within the flow of the gases within the secondary reactor chamber 104.

Figure 4A:
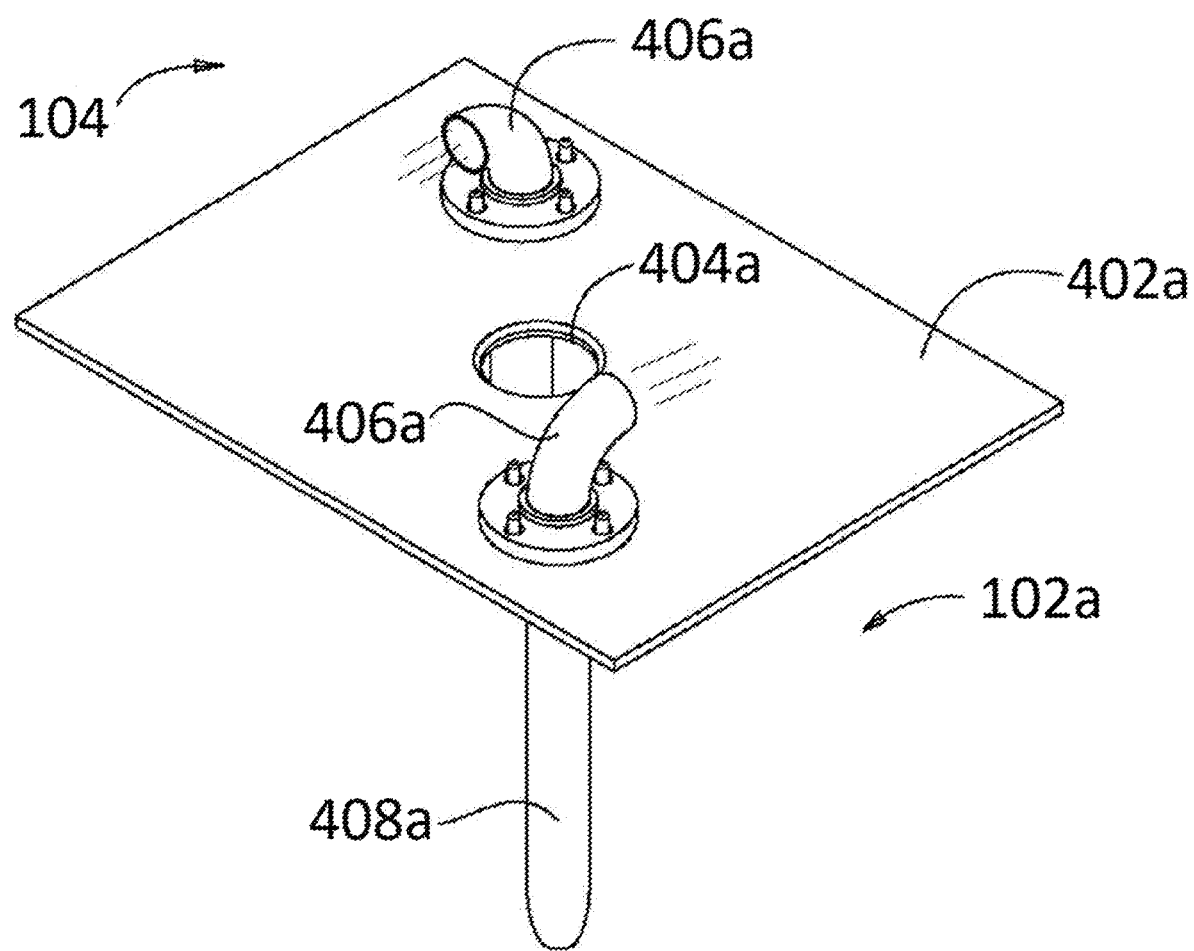
FIG. 4A is a top view of a configuration of first-stage gas pipes from a primary reactor chamber into a secondary reactor chamber according to one embodiment of the present invention.

FIG. 4A is a top view of a configuration of first-stage gas pipes from one of the primary reactor chambers 102a in the secondary reactor chamber 104 according to one embodiment of the present invention. As shown, a wall 402a between the primary reactor chamber 102a and the secondary reactor chamber 104 has a hole 404a through which the feedstock pipe 302a may be implemented. Further, in the implementation of FIG. 4A, two first-stage gas pipes are depicted, each of the first-stage gas pipes comprising an upper portion 406a and a lower portion 408a. The lower portions 408a may extend into areas of the hot zone 202a within the primary reactor chamber 102a. The upper portion of the first-stage gas pipe is a curved pipe that directs the flow of first-stage gas exiting the primary reactor chamber 102a in a vertical direction to flow substantially horizontally. With the use of two first-stage gas pipes, two gas removal locations within the primary reactor chamber may be used. Further, the two upper portions of the first-stage gas pipes may be configured to create turbulence by directing flow within a cyclical pattern in the secondary reactor chamber 104. In other embodiments, turbulence could be generated by creating other flows including gas mixing interference patterns in which the flow of a first portion of gas interferes with the flow of a second portion of gas. Architectures to generate gas mixing interference patterns may include configuring two or more first-stage gas pipes to direct two or more flows of first-stage gas against each other such that conflict between molecular components within the different flows of gas is increased.

Figure 4B:
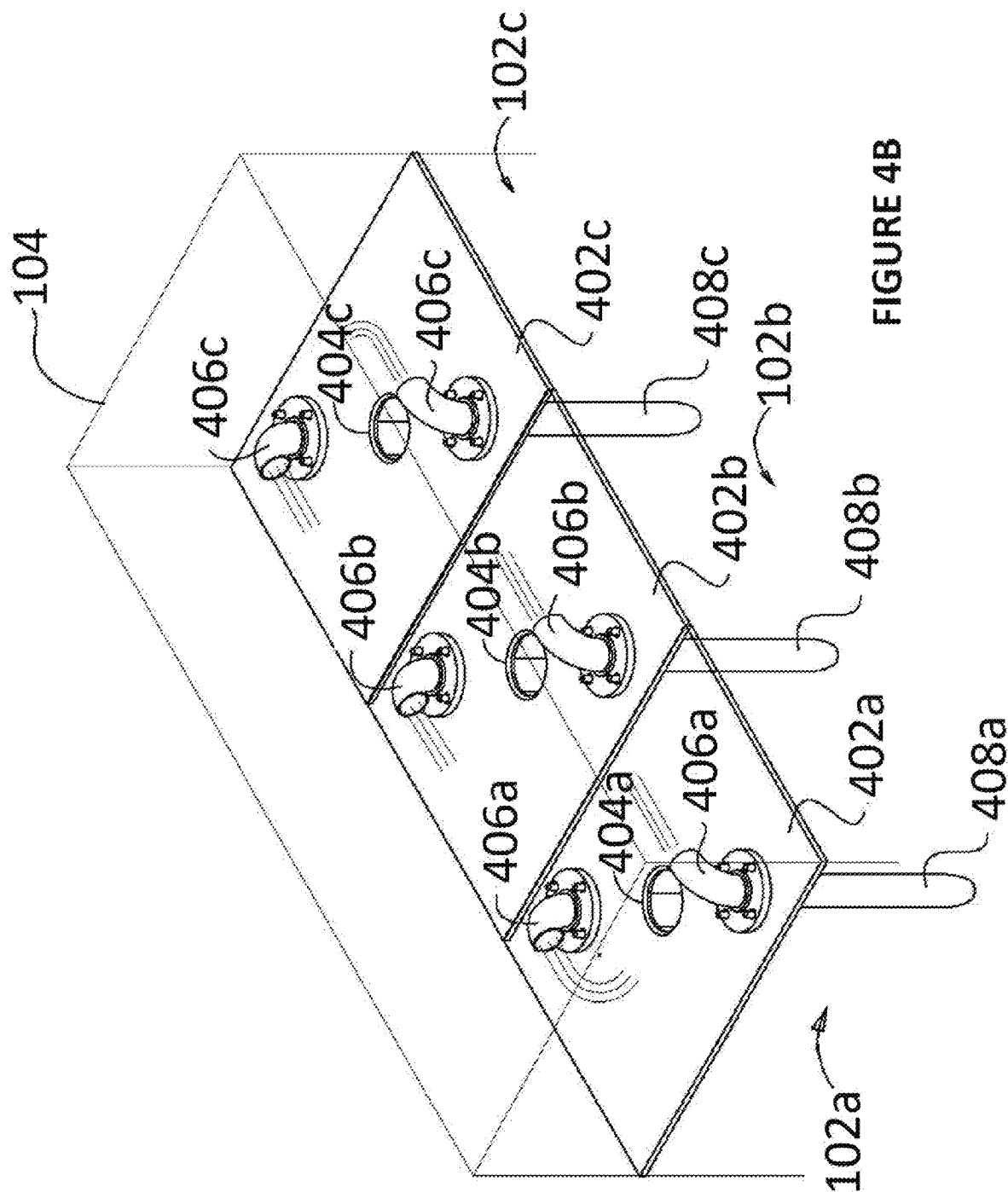
FIG. 4B is a top view of a configuration of first-stage gas pipes from a plurality of primary reactor chambers into a secondary reactor chamber according to one embodiment of the present invention.

FIG. 4B is a top view of a configuration of first-stage gas pipes from the plurality of primary reactor chambers 102a, 102b, 102c into the secondary reactor chamber 104 according to one embodiment of the present invention. In this case, the configuration of the first-stage gas pipes are duplicated for each of the primary reactor chambers 102a, 102b, 102c similar to the configuration of FIG. 4A. In particular, each of the primary reactor chambers 102a, 102b, 102c in this configuration has two first-stage gas pipes in the secondary reactor chamber 104 and each of the first-stage gas pipes comprises a corresponding upper portion 406a, 406b, 406c and a corresponding lower portion 408a, 408b, 408c. In this implementation, each of the primary reactor chambers is operable to output first-stage gas from two locations within its respective hot zone 202a, 202b, 202c and the upper portions 406a, 406b, 406c of the first-stage gas pipes are configured to direct the gas within the secondary reactor chamber 104 in a cyclical pattern which may cause turbulence. As illustrated, the flow of gas within the secondary reactor chamber 104 of FIG. 4B would be counter-clockwise. Through the configuration of the first-stage gas pipes, the gas in the secondary reactor chamber 104 can be configured to flow in various directions and manners. In one embodiment, turbulence could be generated by creating other flows including gas mixing interference patterns in which the flow of a first portion of gas interferes with the flow of a second portion of gas. With the insertion of water vapour into the secondary reactor chamber 104, the movement of the gas in the secondary reactor chamber 104 enables an improved mixing of the gases of the first-stage gas with the water vapour and an increase in chemical reactions. This improved mixing can increase the quality of the second-stage gas that is output from the secondary reactor chamber 104 compared to the first-stage gas input to the secondary reactor chamber 104.

It should be understood that the configurations of FIGS. 4A and 4B could be modified in alternative embodiments. For instance, the number of first-stage gas pipes per primary reactor chamber could be increased or potentially limited to only one. FIG. 5A depicts an alternative implementation in which a primary reactor chamber has four first-stage gas pipes 504a, 504b, 504c, 504d protruding through wall 502 between the primary reactor chamber and the secondary reactor chamber. The four pipes 504a, 504b, 504c, 504d direct the flow of the first-stage gas input to the secondary reactor chamber in order to increase turbulence. In this case, the gas would flow counter-clockwise from pipe 504a to pipe 504b to pipe 504c to pipe 504d and continue in a cyclical pattern. This first-stage gas pipe configuration could be implemented in an architecture in which there was only a single primary reactor chamber connected to the secondary reactor chamber. This first-stage gas pipe configuration could also be implemented in an architecture in which there was a plurality of primary reactor chambers connected to a single secondary reactor chamber. FIGS. 5B and 5C are top views of alternative configurations of first-stage gas pipes. In FIG. 5B, the first-stage gas pipe 506 may be rotated horizontally across an angle A to change the horizontal direction of the first-stage gas flow into the secondary reactor chamber. In FIG. 5C, the first-stage gas pipe 508 may be rotated vertically across an angle B to change the vertical direction of the first-stage gas flow into the secondary reactor chamber. In both cases, the direction of the flow of the first-stage gas may be dictated based on analysis of expected flow within the secondary reactor chamber or may be dictated based on trial and error techniques to maximize mixing within the secondary reactor chamber. In some embodiments, the content of the second-stage gas may be monitored to assess the differences in flow of the gas within the secondary reactor chamber.

Figure 6A:
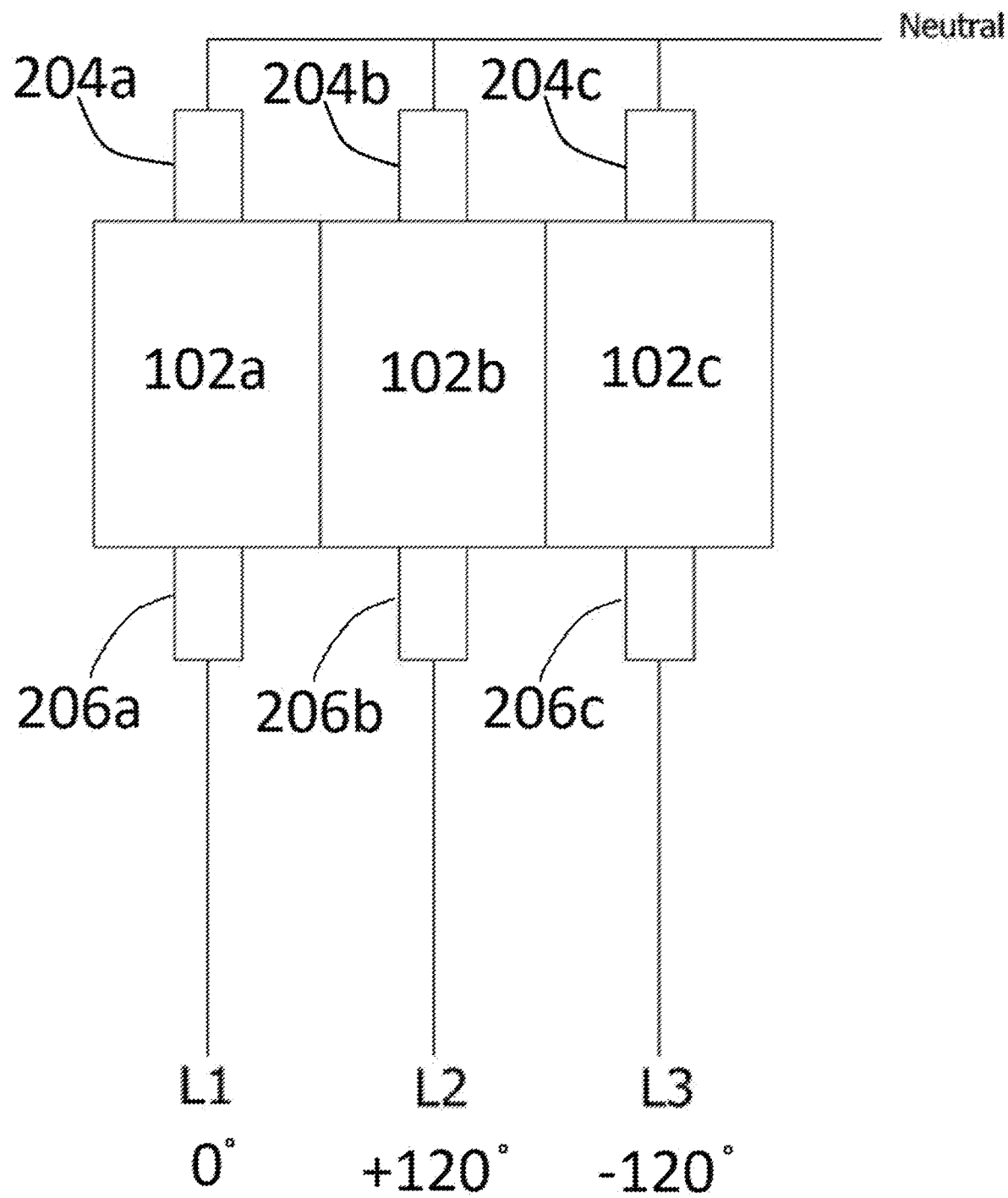
FIGS. 6A and 6B are electrical diagrams illustrating architectures for powering the electrodes within the reactor chambers of FIGS. 2A and 2B according to first and second embodiments of the present invention.
Figure 6B:
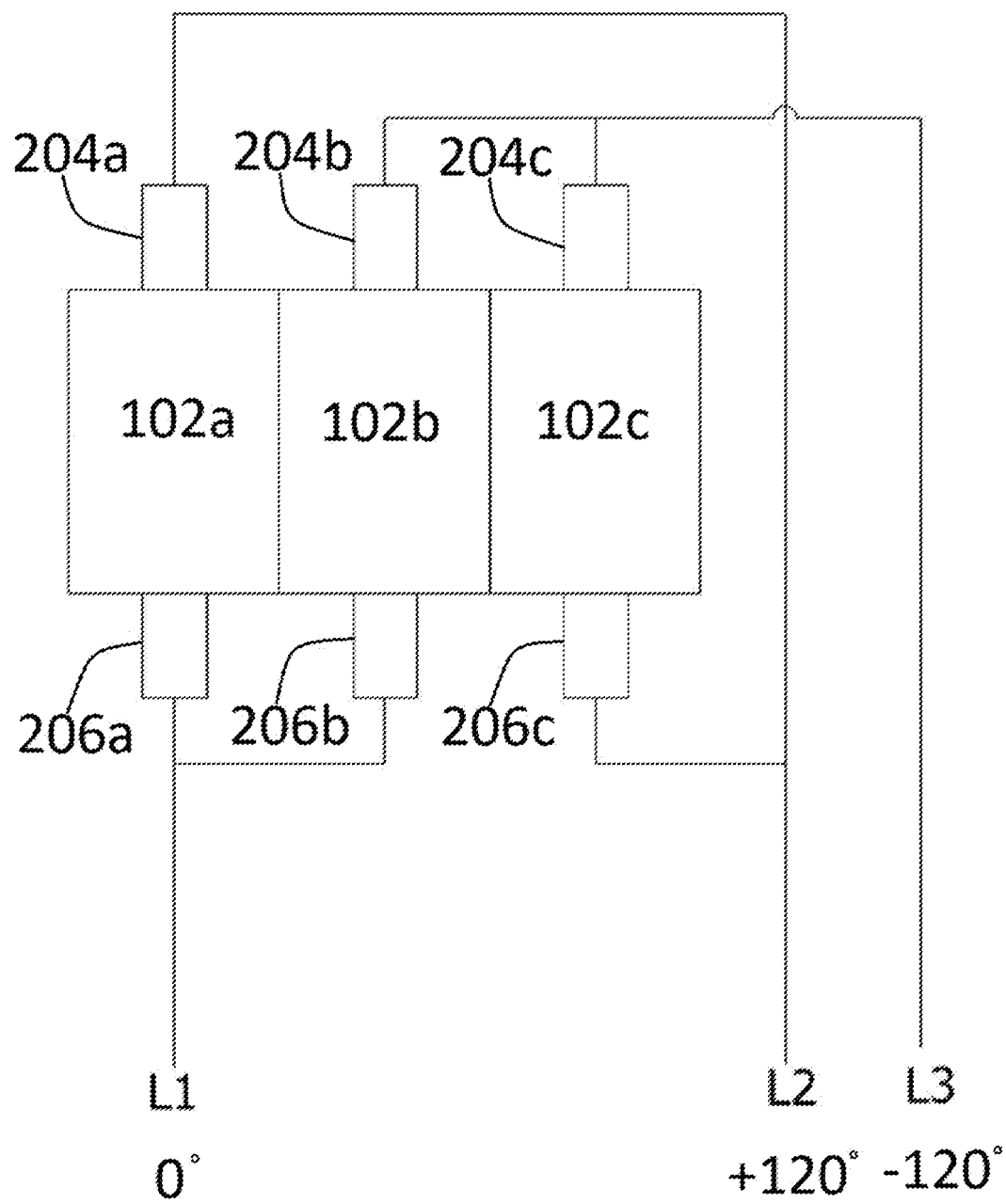

FIGS. 6A and 6B are electrical diagrams illustrating architectures for powering the electrodes within the reactor chambers of FIGS. 2A and 2B according to first and second embodiments of the present invention. In these two embodiments, a three-phase power source is used to power the material processing system. Specifically, as shown in both FIGS. 6A and 6B, each of the primary reactor chambers 102a, 102b, 102c comprise corresponding first electrodes 204a, 204b, 204c and corresponding second electrodes 206a, 206b, 206c. To generate an arc between the first and second electrodes within each of the primary reactor chambers, electricity must flow from one electrode to the other electrode. By using a three phase power source in the systems of FIGS. 6A and 6B and using a modular architecture comprising three primary reactor chambers, a balancing of power utilization can be achieved. The power utilized to generate the arcs within each of the primary reactor chambers can be significant and therefore could affect balance within a power grid if not managed properly. By balancing each set of electrodes within the primary reactor chambers on a different phase of the electricity, the utilization of power can be balanced, reducing stress on the utility managing the power grid and potentially reducing the cost of electricity to the overall system.

FIG. 6A illustrates an architecture in which the three sets of electrodes are connected in a Y configuration. In this case, the first electrodes 204a, 204b, 204c are connected together and may be connected to a neutral line and each of the second electrodes 206a, 206b, 206c are connected to one of the phases L1, L2, L3 of the power from the power source. As shown, the phase of L1 is 0°, the phase of L2 is +120° and the phase of L3 is −120°. FIG. 6B illustrates an architecture in which the three sets of electrodes are connected in a delta configuration. In this case, the second electrodes 206a, 206b are connected to phase 1 L1 of the power from the power source; the first electrode 204a and the second electrode 206c are connected to phase 2 L2 of the power from the power source; and the first electrodes 204b, 204c are connected to phase 3 L3 of the power from the power source. Similar to FIG. 6A, the phase of L1 is 0°, the phase of L2 is +120° and the phase of L3 is −120°. It should understand that other delta configurations are possible with each of the sets of electrodes having different phases of power connected to their respective electrodes. Further, it should be understood that other electrical configurations are possible for connecting a multi-phase power source to a plurality of sets of electrodes within primary reactor chambers as per embodiments of the present invention, thus improving utilization balance across the phases within the power source.

Although described for a three phase power source being used to power three primary reactor chambers, alternative configurations are possible. For instance, in some embodiments, more than three primary reactor chambers are implemented with a third or approximately a third of the primary reactor chambers being powered by each phase of the three-phase power input. In general, a multi-phase power source may be used with ideally the primary reactor chambers divided evenly or close to evenly among the phases of the power source.

Although the embodiments of the present invention are described specifically for the breakdown of carbonaceous material for the generation of syngas, the system could be adapted for other uses. For instance, the system of a plurality of primary reactor chambers coupled to a secondary reactor chamber may be used to breakdown inorganic material such as acids. Further, the use of a plurality of first-stage gas pipes could be configured to generate turbulence within the secondary reactor chamber. Yet further, the use of a multi-phase power source could be used to power a plurality of sets of electrodes within a plurality of primary reactor chambers, each set of electrodes receiving a different phase of the electrical power. The architectural aspects of the present invention may be applied in situations outside of generation of syngas and the scope of the present invention should not be limited to carbonaceous material breakdown and generation of syngas.

Although various embodiments of the present invention have been described and illustrated, it will be apparent to those skilled in the art that numerous modifications and variations can be made without departing from the scope of the invention, which is defined in the appended claims.

What is claimed is:

1. A system comprising:
    a plurality of primary reactor chambers operable to receive material; each of the primary reactor chambers comprising two electrodes at least partially protruding into the respective primary reactor chamber, the electrodes operable to generate an arc capable to generate first-stage gas from breakdown of the material within the respective primary reactor chamber when electricity flows from one of the electrodes to the other; and
    wherein the electrodes in a first one of the plurality of the primary reactor chambers are powered by a first phase output of a multi-phase power source and the electrodes in a second one of the plurality of primary reactor chambers are powered by a second phase output of the multi-phase power source, the first and second phase outputs of the multi-phase power source being different.

2. The system according to claim 1 further comprising the multi-phase power source.

3. The system according to claim 1, wherein the plurality of primary reactor chambers comprises three primary reactor chambers, the multi-phase power source comprises a three-phase power source with three phase outputs, and each of the phase outputs is used to power electrodes within a different one of the primary reactor chambers.

4. The system according to claim 1, wherein the multi-phase power source comprises a three-phase power source with three phase outputs and each of the phase outputs is used to power electrodes within approximately a third of the plurality of primary reactor chambers.

5. The system according to claim 1 further comprising a secondary reactor chamber operable to receive the first-stage gas generated within each of the plurality of primary reactor chambers and to receive water vapour; wherein the gas generated within the plurality of primary reactor chambers combine and interact with the water vapour to form second-stage gas.

6. The system according to claim 5 further comprising at least one first-stage gas pipe connected between each of the primary reactor chambers and the secondary reactor chamber, wherein the first-stage gas generated within each of the primary reactor chambers is output to the secondary reactor chamber via the respective first-stage gas pipe.

7. The system according to claim 6, wherein each of the first-stage gas pipes comprise a portion protruding into the secondary reactor chamber that together are adapted to direct the flow of first-stage gas output from the primary reactor chambers to generate turbulence within the secondary reactor chamber.

8. The system according to claim 6, wherein each of the first-stage gas pipes comprise a portion protruding into the secondary reactor chamber that together are adapted to direct the flow of first-stage gas output from the primary reactor chambers to generate a cyclical pattern within the secondary reactor chamber.

9. The system according to claim 6, wherein each of the first-stage gas pipes comprise a portion protruding into the secondary reactor chamber that together are adapted to direct the flow of first-stage gas output from the primary reactor chambers to generate a gas mixing interference pattern within the secondary reactor chamber.

10. The system according to claim 6, wherein each of the first-stage gas pipes comprise a portion protruding into the secondary reactor chamber that changes a direction of flow for the first-stage gas output from the primary reactor chamber.

11. The system according to claim 6, wherein each of the first-stage gas pipes comprise a portion protruding into the secondary reactor chamber that changes a direction of flow for the first-stage gas output from the primary reactor chamber from a substantially vertical flow to a substantially horizontal flow.

12. The system according to claim 5, wherein the primary reactor chambers are connected together within a single housing.

13. The system according to claim 12, wherein the housing is a rectangular prism.

14. The system according to claim 12, wherein the housing is connected to the secondary reactor chamber and the secondary reactor chamber is above the housing.

15. The system according to claim 12, wherein the secondary reactor chamber is separate from the housing and the secondary reactor chamber is vertically above the housing.

16. The system according to claim 12, wherein the secondary reactor chamber is separate from the housing and the secondary reactor chamber is adjacent to the housing.

17. The system according to claim 5, wherein the plurality of primary reactor chambers are connected below the secondary reactor chamber and each of the primary reactor chambers is connected to at least one material pipe adapted for material to flow into the corresponding primary reactor chamber, wherein the material pipes connected to the primary reactor chambers each traverse the secondary reactor chamber.

* * * * *